UNITED STATES PATENT OFFICE.

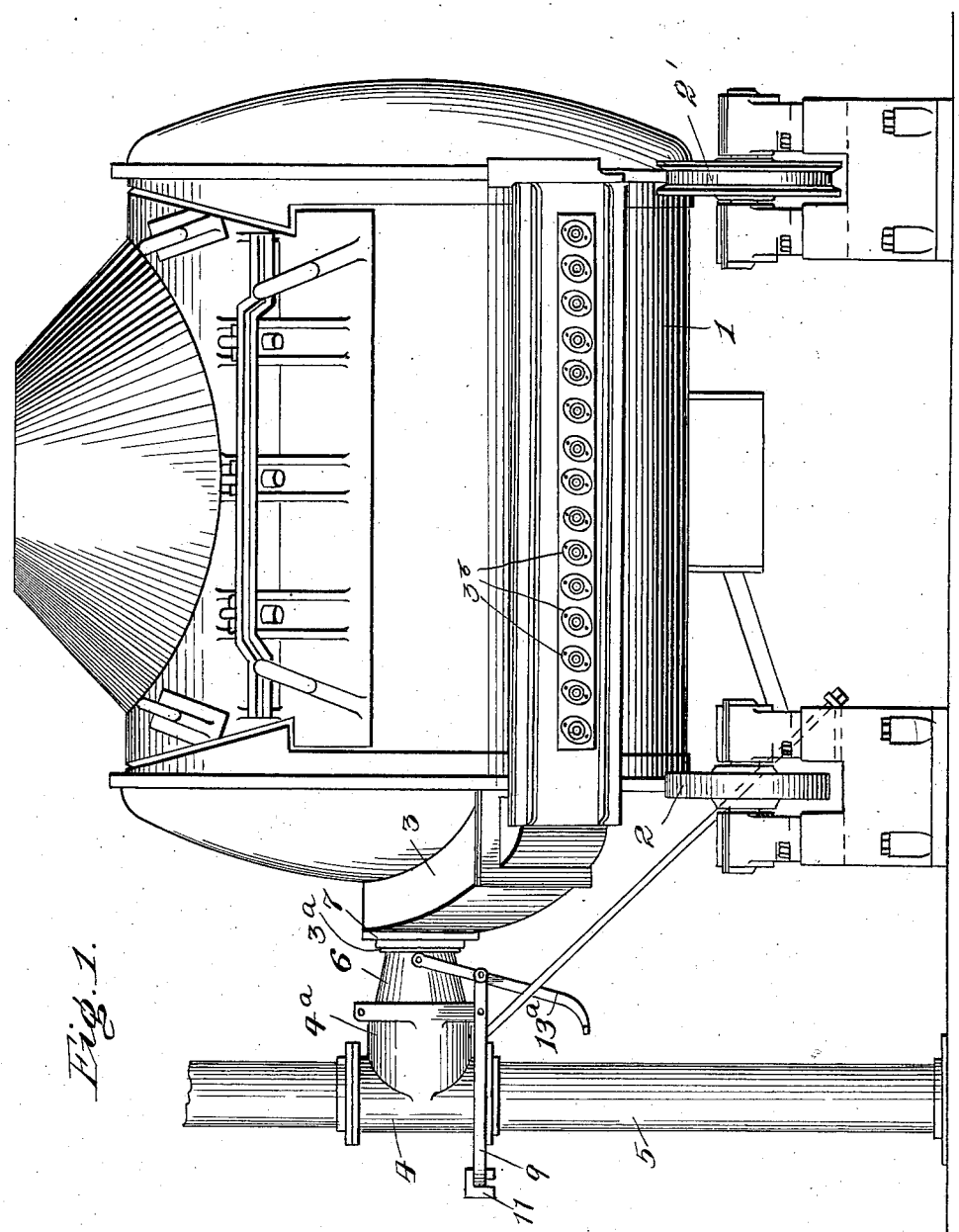

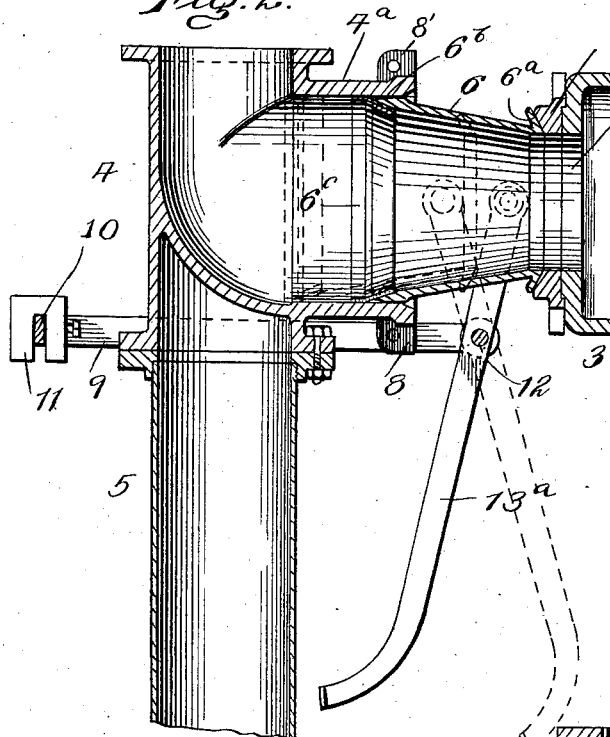
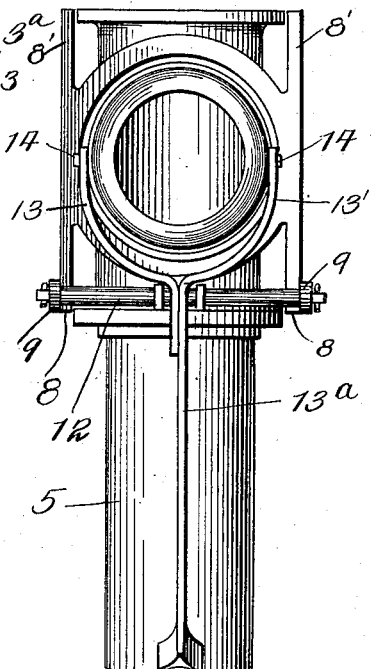
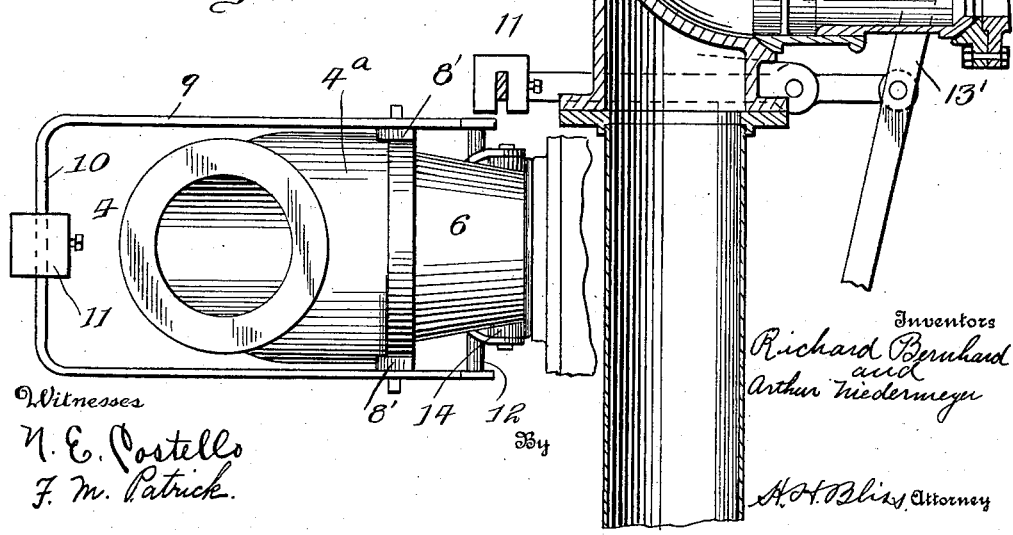

RICHARD BERNHARD AND ARTHUR NIEDERMEYER, OF MILWAUKEE, WISCONSIN, ASSIGNORS TO POWER & MINING MACHINERY COMPANY.

BLAST CONNECTION FOR CONVERTERS.

1,026,556.  Specification of Letters Patent.  Patented May 14, 1912.

Application filed December 21, 1907. Serial No. 407,497.

*To all whom it may concern:*

Be it known that we, RICHARD BERNHARD and ARTHUR NIEDERMEYER, citizens of the United States, residing at Milwaukee, in the county of Milwaukee and State of Wisconsin, have invented certain new and useful Improvements in Blast Connections for Converters, of which the following is a specification, reference being had therein to the accompanying drawing.

This invention relates to blast connections, particularly those employed to connect converters with the blast conduit, the object of the invention being to provide a blast connection of simple construction capable of satisfactorily meeting the various requirements of apparatus of this kind.

In the accompanying drawings—Figure 1 is a view in elevation showing our invention as applied to a rotary converter; Fig. 2 is a vertical sectional view of the blast connection proper with the associated parts of the conduit and converter. Fig. 3 is an elevation of the connection as shown in Fig. 2, looking toward the left in said figure; Fig. 4 is a plan view of the connection as shown in Fig. 2; and Fig. 5 is a vertical sectional view of a modified construction.

Referring to the construction in detail, 1 indicates the body of the converter, and 2, 2' the rollers supporting the same.

3 is the wind-box having an axial blast inlet at $3^a$, and the series of twyers $3^b$ connecting the wind-box with the interior of the converter in the usual manner.

4 is the terminal elbow section of the blast conduit and as shown it is supported on a tubular column 5.

6 is a tapered pipe section or thimble having its larger end slidingly mounted in the horizontal limb $4^a$ of the elbow section 4; with its smaller end projecting toward and in registry with the opening $3^a$ of the converter wind-box. A flanged ring 7 having a spherical seat is bolted to the wind-box as shown, and the end of the thimble 6 has a spherical surface $6^a$ to engage said seat. The larger end of the thimble is preferably rounded on its outer periphery as at $6^b$ and carries a leather packing $6^c$. The rounded surface at $6^b$ permits the thimble 6 to swing within limits in any direction, thus providing in effect a universal joint, and this joint is maintained tight by the leather packing $6^c$ which projects into engagement with the inner surface of the horizontal limb $4^a$ of the elbow section. The thimble is also free to rock or swing at its other end without breaking the connection with the wind-box by reason of the ball-and-socket joint at $6^a$.

The thimble is normally held in engagement with the wind-box of the converter by the unbalanced pressure of the blast upon its inner surfaces. At the same time it is free to be drawn back, thus breaking the connection and permitting the removal of the converter.

In order to prevent the outer end of the thimble from dropping down when the converter is removed, we provide a counterbalancing device. The elbow 4 is provided with depending lugs 8, 8, to which are pivotally connected the side arms 9, 9, of a yoke-shaped lever. The connecting bar 10 of said lever carries a weight 11 and in the free ends of the side bars 9 is mounted a fulcrum pin 12. This pin 12 is connected to the thimble 6 by means of the fork arms 13, 13', which are pivotally connected at their upper ends to the trunnion extensions 14 on said thimble.

With the weight 11 properly proportioned to the weight of the thimble 6 it will be seen that the thimble is effectively supported at all times whether it is in engagement with the converter or partially or wholly drawn back into the limb $4^a$ of the elbow section. By mounting the counterbalancing lever below the thimble the weight of the latter is to a certain extent utilized to maintain it in either of its extreme positions, for when the thimble is thrown forward into engagement with the converter the trunnion connections at 14 are in advance of the fulcrum pin 12 and as the latter is in effect a pivotal abutment, it will be seen that the weight of the thimble tends to press it against the converter. In the same manner the weight of the forward end of the thimble assists in maintaining the thimble in its other extreme position, as indicated in dotted lines in Fig. 2. The advantages secured by this arrangement will be manifest to those familiar with the art because the thimble will at no time be in the way when the converter is being replaced, thus giving the men who handle the converter on the crane plenty of lee-way to bring the shell into proper position without damaging the blast connection.

The fork arm 13' is extended downward beyond the fulcrum pin 12, as indicated at 13ᵃ, to a point adjacent the supporting column 5, so as to constitute a stop limiting the outward movement of thimble 6, and thus preventing the complete removal of the thimble from the elbow 4 when the converter is not in position.

In the modified construction shown in Fig. 5, the connecting thimble is formed in two parts 15 and 16, the former connected by a ball-and-socket joint at 15ᵃ with the discharge end of the elbow 4', while the part 16 is similarly connected at 16ᵃ with the wind-box 3' of the converter. The part 16 is made to fit and telescope within the part 15 which is held yieldingly in engagement with the elbow by means of the spring 17 mounted between a bridge piece 15ᵇ, carried by the part 15, and the disk 18 carried by the rod 19, the latter being connected by means of chain 20 to the wall of the elbow. The part 16 of the connecting thimble is connected as shown with a counterbalancing device constructed substantially the same as that previously described and operating in the same manner. In fact, the operation of the whole connection is much the same as in the other construction, the principal difference being that the telescoping action takes place between the two parts of the connecting thimble rather than between the thimble and the elbow.

In some instances the air supply for the blast will come from below instead of from above and we therefore provide the elbow 4 with duplicate supporting lugs 8', 8', for the counterbalancing lever so that the elbow can be inverted and the necessity of providing a new casting obviated.

What we claim is:

1. In a blast connection, the combination with the blast conduit and the converter, of the connecting thimble between the conduit and converter in telescoping engagement with the conduit, and means for counterbalancing the thimble when out of engagement with the converter, substantially as set forth.

2. In a blast connection, the combination with the blast conduit and converter, of the telescoping connection between the conduit and converter, and means for counterbalancing the converter end of said connection, substantially as set forth.

3. In a blast connection, the combination with the blast conduit and converter of the universally adjustable connection extending from the conduit to the converter with which it detachably engages, and means for counterbalancing the converter end of the connection, substantially as set forth.

4. In a blast connection, the combination with a blast conduit and converter, of the tubular connection between said conduit and converter in telescoping engagement with the conduit, the counterbalancing device for supporting the tubular connection, and means associated with said device for limiting the outward telescoping movement of the connection, substantially as set forth.

5. In a blast connection, the combination with a blast conduit and converter, of the telescoping connection between the blast conduit and converter, the counterbalancing device for the connection, and means associated with said device for limiting the outward telescoping movement of the connection, substantially as set forth.

6. In a blast connection, the combination of the converter, the discharge section of the blast conduit, the rigid connecting thimble having its discharge end flexibly connected to the converter and having its inlet end slidably mounted in the said discharge section and formed to permit a swinging movement of its discharge end, and a pliable packing ring secured directly to the thimble and forming a tight joint between the thimble and the said conduit section, substantially as set forth.

7. In a blast connection, the combination of the converter, the discharge section of the blast conduit, and the tapered connecting thimble having at its larger end a telescoping engagement with the conduit section, and at its smaller end a flexible connection with the converter, the larger end of the thimble being formed to permit a swinging movement of its smaller end, substantially as set forth.

8. In a blast connection, the combination of the converter, the discharge section of the blast conduit, and the connecting thimble having its inlet end larger than its discharge end, said inlet end having a telescoping engagement with the conduit section and said outlet end having a flexible connection with the converter, the larger end of the thimble being formed to permit a swinging movement of its smaller end, substantially as set forth.

9. In a blast connection, the combination of the converter, the discharge section of the blast conduit, and the tapered connecting thimble extending from the conduit section to the converter and having telescoping connection with the conduit section, the taper of the thimble being in the direction of the blast current, whereby said thimble is pressed toward the converter, substantially as set forth.

10. In a blast connection, the combination of the converter, the discharge section of the blast conduit, the telescoping connection between the conduit section and converter flexibly supported at its inlet end, the counter-balancing support disposed beneath the connection and the link connection between said support and the blast connection, the relation of the parts being such that the lower end of the link connection is nearer the converter than its upper end when the blast connection is fully drawn back, substantially as and for the purpose set forth.

11. In a blast connection, the combination of the converter, the discharge section of the blast conduit, the telescoping connection between the conduit section and converter flexibly supported at its inlet end, the counterbalancing support disposed beneath the connection, and the link connection between said support and the blast connection, the relation of the parts being such that the lower end of the link connection is nearer the converter than its upper end when the blast connection is fully drawn back and farther from the converter when the blast connection is in engagement with the converter, substantially as and for the purpose set forth.

12. In a blast connection, the combination of the converter, the discharge section of the blast conduit, the telescoping connection flexibly supported on the conduit section and extending to the converter, and means effective through the weight of the connection for automatically holding the connection in its extreme position when drawn back from the converter, substantially as set forth.

13. In a blast connection, the combination of the converter, the discharge section of the blast conduit, the telescoping connection flexibly supported on the conduit section and extending to the converter, and means effective through the weight of the connection for automatically holding the connection in its extreme positions when drawn back from the converter and when in engagement with the converter, respectively, substantially as set forth.

In testimony whereof we affix our signatures, in presence of two witnesses.

RICHARD BERNHARD.
ARTHUR NIEDERMEYER.

Witnesses:
C. H. BARKER,
ALFRED J. KLUG.

Copies of this patent may be obtained for five cents each, by addressing the "Commissioner of Patents, Washington, D. C."